(12) United States Patent
Larsen

(10) Patent No.: US 8,803,347 B2
(45) Date of Patent: Aug. 12, 2014

(54) CONTROL OF A WIND TURBINE GENERATOR

(75) Inventor: Kim B. Larsen, Hadsund (DK)

(73) Assignee: Vestas Wind Systems A/S, Aarus N. (DK)

( * ) Notice: Subject to any disclaimer, the term of this patent is extended or adjusted under 35 U.S.C. 154(b) by 235 days.

(21) Appl. No.: 13/083,755

(22) Filed: Apr. 11, 2011

(65) Prior Publication Data

US 2011/0248500 A1   Oct. 13, 2011

Related U.S. Application Data

(60) Provisional application No. 61/323,038, filed on Apr. 12, 2010.

(30) Foreign Application Priority Data

Apr. 12, 2010   (DK) .................................. 2010 00305

(51) Int. Cl.
*F03D 9/00*   (2006.01)
*H02P 9/04*   (2006.01)

(52) U.S. Cl.
USPC ............................................. 290/44; 290/55

(58) Field of Classification Search
USPC ....... 290/44, 55; 416/1; 415/1; 700/286, 288, 700/290; 322/44, 24, 20
See application file for complete search history.

(56) References Cited

U.S. PATENT DOCUMENTS

| 7,840,312 | B2 | 11/2010 | Altemark et al. |
| 2008/0088129 | A1 | 4/2008 | Altemark et al. |
| 2010/0145128 | A1 | 6/2010 | Hommeltoft |

FOREIGN PATENT DOCUMENTS

| DK | WO 2008/145128 | * 12/2008 |
| JP | 2007-097334 | * 4/2007 |
| WO | 2006066797 A1 | 6/2006 |
| WO | 2008145128 A2 | 12/2008 |

OTHER PUBLICATIONS

"Feed-forward compensates for servo-loop errors", Johnson, Hydraulics & Pneumatics; Aug. 1997; 50, 8; pp. 14, 19.*
Danish Patent and Trademark office, Search Report issued in related Danish Application No. PA 2010 00305 dated Nov. 15, 2010.
Triggianese, et al., "Improved and extended DG capability in voltage regulation by reactive and active power", Powereng 2007, Apr. 12-14, Setubal, Portugal.
Danish Patent and Trademark office, Office Action issued in related Danish Application No. PA 2010 00305 dated Nov. 17, 2010.

* cited by examiner

*Primary Examiner* — Tulsidas C Patel
*Assistant Examiner* — Thomas Quigley
(74) *Attorney, Agent, or Firm* — Patterson & Sheridan, LLP

(57) ABSTRACT

A method for controlling a wind turbine generator is disclosed. The method comprises comparing an output power reference value and an actual output power value in a first control block with a first controller having a first control dynamics, comparing the output from the first control block with an actual generator shaft power value in a second control loop with a second controller having a second control dynamics, to determine a generator control signal, wherein the output power reference value is fed-forward and summed with the output of the first controller in the first control block. The disclosed method allows for fast reactions to changes in the output power reference value by the second controller regardless of the speed of the first controller.

16 Claims, 3 Drawing Sheets

CONTROL OF A WIND TURBINE GENERATOR

CROSS-REFERENCE TO RELATED APPLICATIONS

This application claims the benefit of U.S. Provisional Application No. 61/323,038, filed Apr. 12, 2011, and claims priority under 35 U.S.C. §119 to Danish Patent Application No. PA 2010 00305, filed Apr. 12, 2011, the content of each is hereby incorporated by reference herein in its entirety for all purposes.

TECHNICAL FIELD

The present invention relates to the field of wind turbine generators and, in particular, to control a wind turbine generator by using two controllers.

BACKGROUND OF THE INVENTION

In recent time, wind turbines have become an attractive way of producing electrical power. In order to do so, the power in the wind is captured by a set of blades (normally two or three) of a wind power plant. The wind captured by the blades causes a shaft connected to the blades to rotate. The shaft is connected to a rotor of a generator, which hence rotates at the same speed as the shaft, or at a multiple of the speed of the shaft in case the rotor is connected to the shaft via a gearbox. The generator then converts the mechanical power provided by the wind into electrical power for delivery to a power grid.

There are a number of control problems associated with wind turbine generators. For example, there is a need to control the output power of the wind power plant and also to make it less sensitive to different kinds of disturbances that may occur, such as resonances in the drive train of the wind turbine or disturbances on the power grid.

WO 2008/145128 discloses a wind turbine power controller which is connected to a wind turbine generator and a power grid. The power controller comprises two control loops referred to as an external power control loop and an internal current/torque control loop, the external power control loop being considerably slower than the internal current/torque control loop. The wind turbine in WO 2008/145128 further comprises resonant control means which modifies the power reference value provided to the external control loop. In this way, influences of resonances in the drive train of the wind turbine may be minimized.

Having a slow outer control loop may be favorable from the point of view that it will act as a low-pass filter for high frequency disturbances in the power feedback signal. However, having a slow outer control loop will also cause the wind turbine generator to have a slow response to changes in the power reference signal. Thus there is a need for a controller which may have a fast response to changes in the power reference signal regardless of the existence of a slow outer control loop.

SUMMARY OF THE INVENTION

In view of the above, an objective of the invention is to provide a method and an apparatus for controlling a wind turbine generator which allow for a fast response to changes in a power reference signal regardless of the speed of an outer control loop.

According to a first aspect, the present invention is realized by a method for controlling a wind turbine generator, comprising comparing an output power reference value and an actual output power value in a first control block with a first controller having a first control dynamics, comparing the output from the first control block with an actual generator shaft power value in a second control loop with a second controller having a second control dynamics, to determine a generator control signal, wherein the output power reference value is fed-forward and summed with the output of the first controller in the first control block.

By an output power reference value is meant a desired output power value.

By an actual output power value is meant a measured value of the output power.

By a generator shaft power value is meant a measured value of the generator shaft power, i.e. a measured value of the power of a rotating shaft in the generator.

By a generator control signal is meant a signal which, when used as an input to the wind turbine generator, controls the generator shaft power of the generator.

With the arrangement according to the first aspect, the output power reference value which is provided to the first controller is fed forward to the second controller. In this way, the second controller may quickly respond to changes in the output power reference value regardless of the speed of the first controller.

An advantage of this embodiment is thus that the second controller may have a fast response to changes in the output power reference value regardless of the speed of the control dynamics of the first controller.

A further advantage of this embodiment is that the wind turbine will be able to track a power speed curve in an improved manner.

According to one embodiment of the invention the control dynamics of the second controller is faster than the control dynamics of the first controller.

Due to the fact that the control dynamics in the first controller are slower than the control dynamics in the second controller, the first controller will have a slower response to changes in the output power reference signal and the actual output power value. In particular, it will have a slow response to disturbances in the feed-back signal, i.e. the actual output power value, thereby filtering out high frequent disturbances in the feed-back signal before transferring it to the second controller and the wind turbine generator.

Another advantage of this embodiment is that during a low voltage event, where the turbine is expected to remain connected to the power grid, no mode change is necessary in the controllers. More specifically, during a low voltage event the level of interference is very high, thereby calling for prior art controllers to change mode, i.e. change to a control mode less sensitive to disturbances. In most cases this corresponds to completely disabling the first control loop and only using the second control loop for controlling the wind turbine generator. However, since the outer controller according to the present invention will act as to filter out disturbances in the feed-back signal, there is no need to change the control mode in the controllers thereby considerably simplifying the control structure.

A still further advantage of this embodiment is that there will be less disturbance in the generator shaft power and thereby also in the drive train of the generator.

According to one embodiment of the invention the first controller and the second controller are either Proportional-Integral (PI)-controllers or Proportional-Integral-Derivative (PID)-controllers.

An advantage of this embodiment is that PI-controllers or PID-controllers provide an easy way of implementing the first controller and the second controller.

According to one embodiment of the invention, the first controller is associated with a first time constant and the second controller is associated with a second time constant, wherein the second time constant is smaller than the first time constant.

An advantage of this embodiment is that by using time constants it becomes easy to design a second controller which is faster than a first controller by simply letting the second time constant be smaller than the first time constant.

According to one embodiment of the invention the actual output power value is subject to disturbances. Moreover, according to one embodiment, the first controller acts as a low pass filter on the actual output power value, thereby substantially removing the disturbances.

An advantage of this embodiment is that high frequent disturbances in the actual output power value which is fed back to the first controller are being filtered out, since the first controller acts as a low pass filter. Thereby, the disturbances are not transferred to the second controller and the wind turbine generator.

According to a second aspect, the present invention is realized by an apparatus for controlling a wind turbine generator, the apparatus comprising,
 a first control block comprising a first controller having a first control dynamics, the first control block being adapted to compare an output power reference value and an actual output power value,
 a second control block comprising a second controller having a second control dynamics, the second control block being adapted to determine a generator control signal comparing the output of the first control block, wherein the first control block further comprises a feed-forward of the output power reference value for summation with the output of the first controller.

According to one embodiment of the invention the second control block is further adapted to transmit the generator control signal to the wind turbine generator for generation of the actual output power value.

The features and advantages of the first aspect of the invention generally applies to the second aspect of the invention.

Other objectives, features and advantages of the present invention will appear from the following detailed disclosure, from the attached claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION OF PREFERRED EMBODIMENTS

Figure 1:
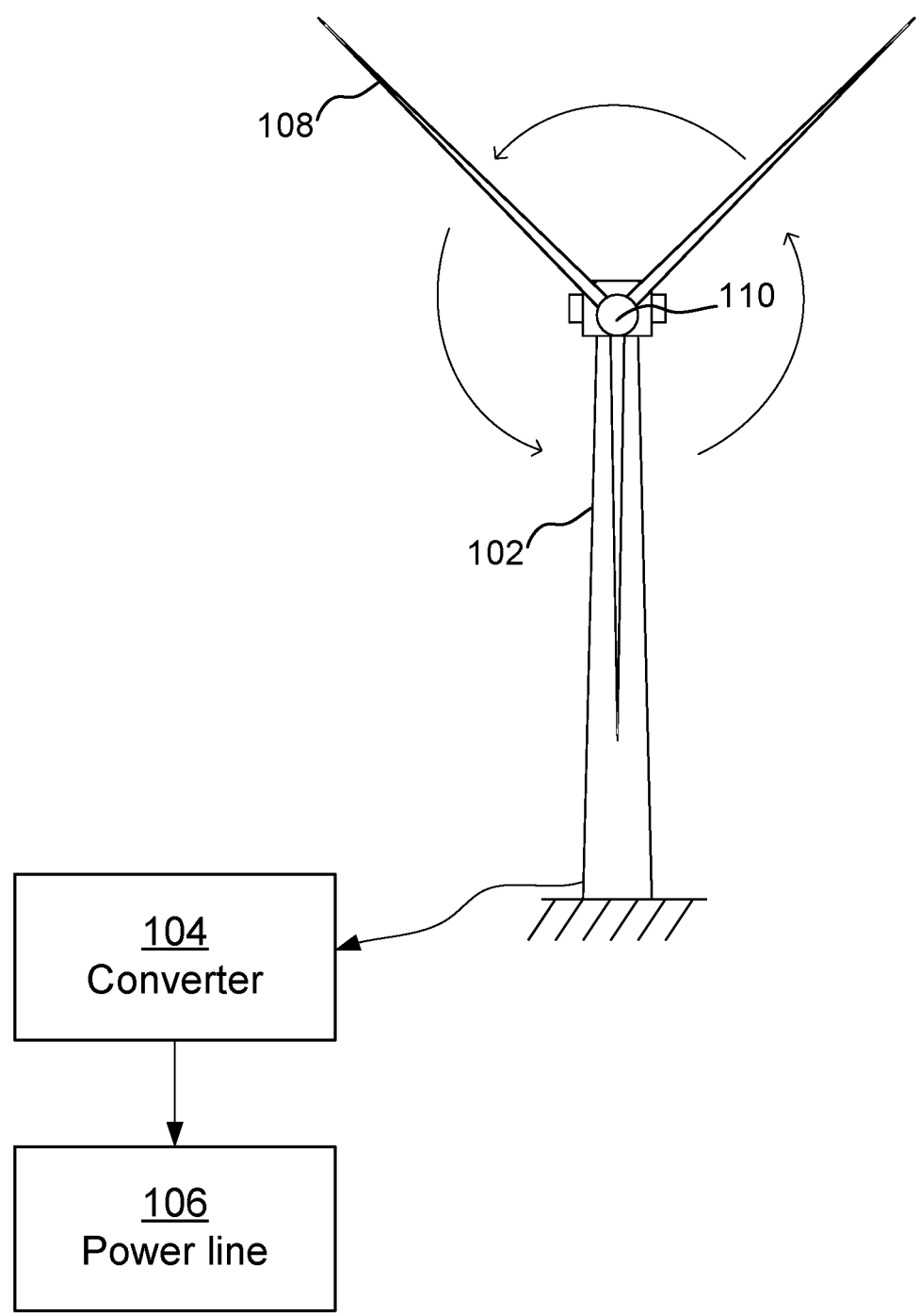
FIG. 1 is a schematic illustration of a wind turbine which is connected to a power grid.

FIG. 1 illustrates a wind turbine 102 which is connected to a power grid 106 via a converter 104. The illustrated wind turbine 102 is arranged to generate electrical power from the wind and to distribute the generated electrical power to a power grid 106. The wind turbine 102 comprises a number of rotor blades 108 which are caused to rotate by the wind. The rotor blades 108 are connected to a shaft 110 which rotates due to the rotation of the rotor blades 108. The shaft 110 is in turn connected to a rotor of a generator (not shown), herein referred to as a generator shaft (not shown). Typically, the shaft 110 and the generator shaft are connected via a gear box (not shown) so that the rotation speed of the generator shaft becomes a multiple of the rotation speed of the shaft 110. The generator then converts the mechanical power of the rotating generator shaft to electrical power. The generator may for example be a singly- or doubly-fed synchronous generator, a permanent magnet (PM) generator or an induction generator. It is also possible to omit the gear box by using a multi-pole generator suitable for a low rotational speed of the shaft 110. In this case, the drive shaft 110 is directly coupled to the generator. An alternative transmission may also be provided at the drive shaft 110 in order to drive the generator as required.

For optimum performance in respect of converting the wind energy into electrical energy the shaft 110 will vary its speed as a function of the wind speed. Since the rotational speed of the generator shaft is proportional to the rotational speed of the shaft 110, the amplitude and frequency of the voltage signal provided by the generator will vary according to the rotational speed of the shaft 110. Before feeding the power generated by the generator to a power grid 106, the voltage signal provided by the generator therefore has to be converted so that the amplitude and frequency of the voltage signal comply with a regulated alternating current (AC) voltage for the power grid 106. In order to do so, the generator may be coupled to the power grid 106 via a converter 104.

In brief, the converter 104 comprises a generator side power converter (not shown) which transforms the variable frequency voltage signal, corresponding to a generator shaft power, into a direct current (DC) voltage, and a grid side power converter which operates an inverter, for converting the DC voltage into a regulated AC voltage, corresponding to an actual output power. The output power is thereafter provided by the wind turbine 102 to the power grid 106.

In this way, power generated by the generator of the wind turbine 102, herein referred to as generator shaft power, is converted by converter 104 into an actual output power to be fed to the power grid 106. The power on the power grid 106 may typically be subject to disturbances. For example, changes or disturbances in the grid may affect the power on the power grid 106, as well as other grid faults, such as low voltage events. It is desirable that the generator of the wind turbine 102 may compensate for some of the variations on the power grid, such as compensation for system losses. However, it is not desirable that the generator compensates for high frequent noise on the power grid 106, since that would lead to an unnecessarily irregular behavior of the power generation of the wind turbine 102.

Figure 2:
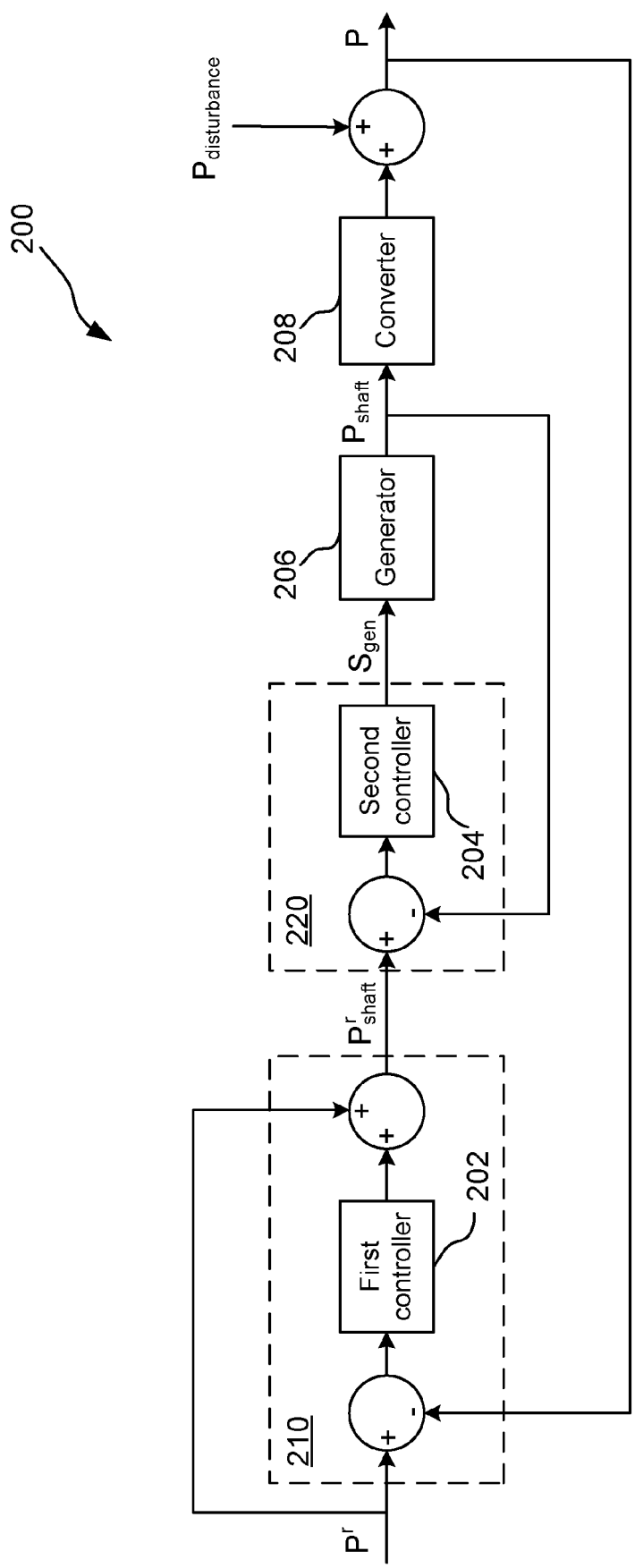
FIG. 2 is a schematic block diagram illustrating a control structure according to embodiments of the invention.

FIG. 2 is a schematic block diagram illustrating a control structure 200 for controlling a wind turbine generator 206 which delivers power to a power grid via a converter 208. The dynamics of the generator 206, i.e. the way the generator responds to an input signal, may be modeled by means of a transfer function. Typically, the generator has a fast response to changes in the input signal, thereby making it sensitive to high frequency disturbances in the input signal. Likewise, the dynamics of the converter 208 may be modeled by a transfer function.

The control structure comprises a first controller 202 for controlling an actual output power value P to be provided to a power grid, and a second controller 204 for controlling a generator shaft power $P_{shaft}$, i.e. a power of a rotating shaft (the generator shaft) in the generator 206.

The output power value P of the wind turbine 102, for provision to the power grid, is provided as feedback to the first controller 202. The first controller 202 is subsequently coupled to the second controller 204, which in turn is coupled to the generator 206. More precisely, the first and second controllers, 202 and 204, are coupled in cascade, meaning that an output of the first controller 202 contributes to an input reference signal $P^r_{shaft}$ of the second controller 204. Thus, the illustrated control structure comprises two nested control loops; an outer control loop comprising the first controller and an inner control loop comprising the second controller.

The input to the first controller 202 is a difference value between an output power reference value $P^r$ and an actual output power value P which is fed back to the first controller. The output power reference value $P^r$, which for example may be set by an operator of the wind turbine, corresponds to a desired output power value of the wind turbine 102 to the power grid. The actual output power value P, corresponds to a measured output power value of the wind turbine 102 which matches the power in the power grid. In this way, the difference value $P^r-P$ may be seen as an error value. Further, the actual output power value P may be subject to disturbances $P_{disturbances}$. For example, the disturbances $P_{disturbances}$ may be due to system losses or changes in the power consumption of any auxiliary components in the wind turbine 102, for example a blade pitching system, a nacelle yawing system, cooling systems, fans, lights, etc.

Based on the difference value $P^r-P$, the first controller 202 determines an output. The first controller 202 is associated with a first control dynamics which defines the response of the first controller 202 to an input signal. In this way, the output is determined as a function of the difference value $P^r-P$ and the first control dynamics. For example, the first control dynamics may be defined by a transfer function. Preferably, the first control dynamics is slow, meaning that it is designed to act as a low pass filter for changes in the input $P^r-P$. Advantageously, the first controller 202 may thus filter out disturbances in the actual output power value P. However, the slow control dynamics of the first controller 202 also implies that it will have a slow response to changes in the output power reference value $P^r$.

The input to the second controller 204 is a difference value between a generator shaft power reference value $P^r_{shaft}$ and an actual generator shaft power value $P_{shaft}$ which is fed back to the second controller 204. Similar to the above, the generator shaft power reference value $P^r_{shaft}$ is a desired value for the generator shaft power, and the actual generator shaft power value $P_{shaft}$ is a measured value of the generator shaft power.

The generator shaft power reference value $P^r_{shaft}$ is a combination of the output from the first controller 202 and the output power is reference value $P^r$, that is, the input to the second controller 204 is a sum of the output from the first controller 202 and the output power reference value $P^r$. Thus, the control structure 200 in FIG. 2 comprises a feed-forward of the output power reference value $P^r$ to the second controller 204. In this way, the second controller 204 is enabled to respond quickly to changes in the output power reference value $P^r$, while, at the same time, high frequency disturbances in the actual output power value P may be filtered out by the first controller 202 and will hence not reach the second controller 204 and the generator 206.

Based on the difference between the generator shaft power reference value $P^r_{shaft}$ and the actual generator shaft power value $P_{shaft}$, the second controller 204 determines a generator control signal $S_{gen}$. The second controller 204 has a second control dynamics which define the response of the second controller 204 to an input signal. In this way, the generator control signal is a function of the difference $P^r_{shaft}-P_{shaft}$ and the second control dynamics. Preferably, the second control dynamics is faster than the first control dynamics. In this way, and in combination with the feed-forward of the output power reference value, the second controller 204 may have a fast response to changes in the output power reference value.

According to embodiments, the first controller 202 and/or second controller 204 may be PI-controllers. Alternatively, the first controller 202 and/or second controller 204 may be PID-controllers. The first controller 202 and second controller 204 may further be associated with a first time constant and a second time constant, respectively. The respective time constants are a measure of how fast the control dynamics of the first controller 202 and the second controller 204 are. Typically, the time constants are expressed in terms of parameters of the transfer functions of the controllers. Preferably, the second time constant is smaller than the first time constant, thereby implying that the second controller 204 has a faster control dynamics than the first controller 202.

By having the above disclosed feed-forward of the output power reference value $P^r$, the illustrated control structure 200 thus allows for fast reaction to reference changes in the output power reference value $P^r$ by the inner control loop comprising the second controller 204. At the same time, the outer control loop comprising the first controller 202 may ensure that the actual output power value P is correct and compensates for system losses and disturbances, such as disturbances in the power consumption. In other words, the illustrated control structure 200 allows for a decoupling of the generator shaft power from disturbances on the power grid, while maintaining a fast control response towards changes in the output power reference value $P^r$.

In the control structure of FIG. 2 is further illustrated an apparatus for controlling a wind turbine generator according to embodiments. The apparatus comprises a first control block 210 comprising the first controller 202 and a second control block 220 comprising the second controller 204.

The first control block 210 is adapted to control an actual output power value P. More precisely, the first control block 210 is adapted to compare the output power reference value $P^r$ and the actual output power value P. Moreover the first control block 219 is adapted to feed-forward the output power reference value and summing it with the output of the first controller.

The second control block 220 is adapted to control a generator shaft power $P_{shaft}$. In more detail, the second control block 220 is adapted to determine a generator control signal $S_{gen}$ by comparing the output of the first control block 210, and an actual generator shaft power value $P_{shaft}$.

In one embodiment, the first control block 210 and the second control block 220 further comprise a receiver arranged to receive, preferably via wire, optical link or wireless link, the output power reference value $P^r$ and the actual output power P, and the generator shaft power reference value $P^r_{shaft}$, being a summation of the output from the first controller and the output power reference value, respectively. Further, the first control block 210 and the second control block 220 may comprise a transmitter arranged to transmit the determined shaft power reference value $P^r_{shaft}$ and the generator control signal $S_{gen}$, respectively. The transmitter of the second control block 220 may comprise a driving stage which adapts the signal level of the generator control signal $S_{gen}$ to a signal level which is suitable for the generator 206. In this way, the transmitter may thus comprise an interface for the signals transmitted from the second control block 220 to the generator 206.

In order to compare the output power reference value $P^r$ and the actual output power value P, as well as to sum the output from the first controller to the output power reference value $P^r$, the first control block 210 may further comprise a processing unit which is arranged to perform these steps. Likewise, the second control block 220 may comprise a processing unit which is arranged to compare the generator shaft power reference value $P^r_{shaft}$ and the actual generator shaft power value $P_{shaft}$. Still further, the first control block 210 and the second control block 220 may comprise a memory which is arranged to store the received values and which also may be arranged to store computer program instructions for determining a generator shaft power reference value $P^r_{shaft}$ and a generator control signal $S_{gen}$, respectively.

Figure 3:
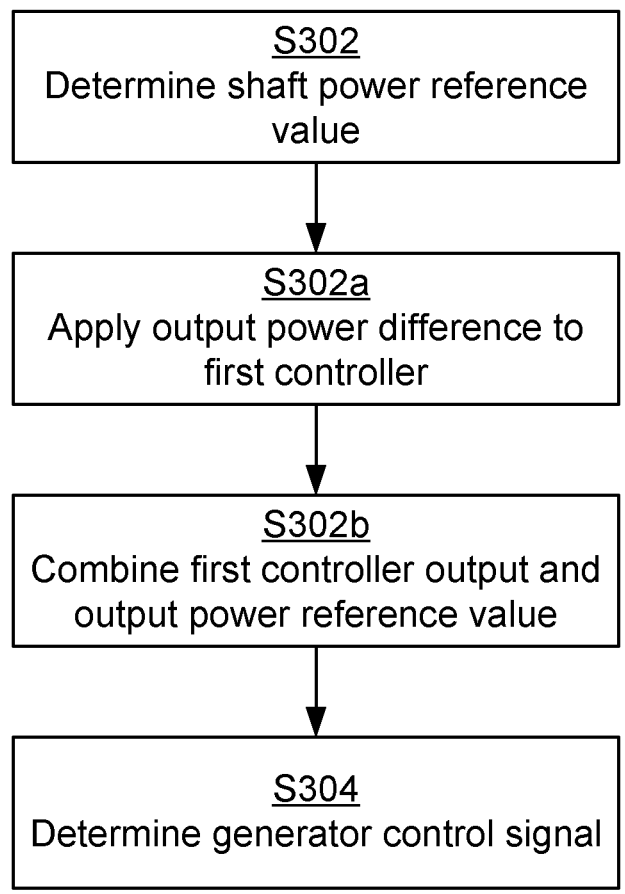
FIG. 3 is a flowchart of a method according to embodiments of the invention.

A method for controlling a wind turbine generator will now be described with reference to the flowchart of FIG. 3 and the control structure of FIG. 2.

In a step S302 the output power reference value $P^r$ is compared to an actual output power value P. Step S302 may for example be performed by the first control block 210. The comparison may for example be made by determining a difference between the output power reference value $P^{ref}$ and the actual output power value P. The difference may for example be determined by a processing unit or dedicated hardware in the first control block 210. The actual output power P may be measured by any known means.

The result of the comparison may then be input to the first controller 202 which determines an output based on the input. The output of the first controller 202 is typically determined by applying a filter to the output power difference value. The filter may for example be defined in terms of a transfer function having a number of parameters which determine the control dynamics of the first controller 202, i.e., the way the first controller responds to an input signal.

In step S304, which for example may be performed by the first control block 210, the output power reference value $P^r$ and the output of the first controller 202 are combined. More precisely, the output power reference value $P^r$ and the output of the first controller 202 may be added together. For example, the summation may be performed by a processing unit or hardware of the first control block 210.

As a result of step S304, the output of the first controller 202 is combined with a feed-forward of the output power reference value $P^r$.

In step S306 a generator control signal $S_{gen}$ is determined. Step S306 may for example be performed by the second control block 220. The generator control signal $S_{gen}$ may be determined in two steps. First the output from the first control block is compared with an actual, fed-back, generator shaft power value $P_{shaft}$ of the generator 206. $P_{shaft}$ may be measured by any known means. The comparison in step S306 may for example be determined by a processing unit or hardware of the second control block 210. Next the result of the comparison may be used as input to the second controller 204. As a result of applying the result of the comparison to the second controller 204, the second controller 204 determines a generator control signal $S_{gen}$. The generator control signal $S_{gen}$ and its properties depend on the control dynamics of the second controller 204. As disclosed above in connection to FIG. 2, the control dynamics of the second controller 204 is typically faster than the control dynamics of the first controller 202. In this way the second controller 204 may have a fast response to changes in the output power reference value $P^r$.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for controlling a wind turbine generator, comprising:
    comparing an output power reference value and an actual output power value in a first control block with a first controller having a first control dynamics, wherein the actual output power value is provided to a power grid; and
    comparing an output of the first control block with an actual generator shaft power value in a second control block with a second controller having a second control dynamics, to determine a generator control signal,
    wherein the output power reference value is fed-forward and summed with an output of the first controller to create the output of the first control block.

2. The method of claim 1, wherein said second control dynamics is faster than said first control dynamics.

3. The method of claim 1, wherein said first controller and said second controller are either Proportional-Integral (PI)-controllers or Proportional-Integral-Derivative (PID)-controllers.

4. The method of claim 3, wherein said first controller is associated with a first time constant and said second controller is associated with a second time constant, and wherein said second time constant is smaller than said first time constant.

5. The method of claim 1, wherein said actual output power value is subject to disturbances.

6. The method of claim 5, wherein said first controller acts as a low pass filter on said actual output power value, thereby substantially removing said disturbances.

7. An apparatus for controlling a wind turbine generator, said apparatus comprising:
    a first control block comprising a first controller having a first control dynamics, said first control block being adapted to compare an output power reference value and an actual output power value which is provided to a power grid; and
    a second control block comprising a second controller having a second control dynamics, said second control block being adapted to determine a generator control signal by comparing an output of the first control block and an actual generator shaft power value,
    wherein the first control block further comprises a feed-forward of the output power reference value for summation with an output of the first controller to create the output of the first control block.

8. The apparatus of claim 7, wherein said second control dynamics is faster than said first control dynamics.

9. The apparatus of claim 7, wherein said first controller and said second controller are PI-controllers.

10. The apparatus of claim 9, wherein said first controller is associated with a first time constant and said second controller is associated with a second time constant, and wherein said second time constant is smaller than said first time constant.

11. The apparatus of claim 7, wherein said second control block is further adapted to transmit said generator control signal to said wind turbine generator for generation of said actual output power value.

12. The apparatus of claim 7, wherein said actual output power value is subject to disturbances.

13. The apparatus of claim 12, wherein said first controller is adapted to act as a low pass filter on said actual output power value, thereby substantially removing said disturbances.

14. The method of claim 1, wherein an input of the second controller is a difference between the actual generator shaft power value and the output of the first control block.

15. The apparatus of claim 7, wherein an input of the second controller is a difference between the actual generator shaft power value and the output of the first control block.

16. The method of claim 1, further comprising converting the actual generator shaft power value by a converter into the actual output power value to be fed to the power grid and subject to disturbances from the power grid.

* * * * *